Oct. 3, 1950    J. K. CHAPMAN    2,524,515
PHASE CONTROL CIRCUIT
Filed Oct. 29, 1948

Inventor:
James K. Chapman,
by Merton W. Moore
His Attorney.

Patented Oct. 3, 1950

2,524,515

UNITED STATES PATENT OFFICE 2,524,515

PHASE-CONTROL CIRCUIT

James K. Chapman, Syracuse, N. Y., assignor to General Electric Company, a corporation of New York Application October 29, 1948, Serial No. 57,351

8 Claims. (Cl. 323—109)

1

This invention relates to a control apparatus which is sensitive to phase differences between current and voltage in alternating current circuits.

My invention may be used in a network comprising a source of alternating voltage and a utilization circuit, for the purpose of controlling some elements, in either the source or the circuit, so as to maintain a fixed phase relation between the voltage and the current. For instance, my invention may be utilized to maintain an antenna circuit in tune while the frequency of operation of a transmitter is varied. In such an application the control device is utilized to act on some variable element in the antenna circuit such as a condenser or a variometer. In another application, my invention may be utilized to maintain a fixed phase relation between the voltage applied to a circuit and the current through it, the circuit not being subject to regulation. In such case, the control element is located in the generator and it is operated in a manner to vary the frequency to accomplish the intended object.

It is an object of my invention to provide a new and improved circuit for operating a control circuit in response to a phase variation between a current and a voltage.

Another object of my invention is to provide a circuit for automatically maintaining a utilization circuit tuned to provide a pure resistive impedance at the frequency of operation of a generator over a wide range of frequencies.

A further object of my invention is to provide control means for a variable element in an alternating current generator which automatically varies the frequency of operation in a manner to maintain a constant phase relationship between the voltage applied to a utilization circuit and the current through it, in spite of changes in the characteristics of the utilization circuit.

For additional objects and advantages and for a better understanding of the invention, attention is now drawn to the following description and accompanying drawing and also to the appended claims in which the features of the invention believed to be novel are particularly pointed out.

Figure 1:
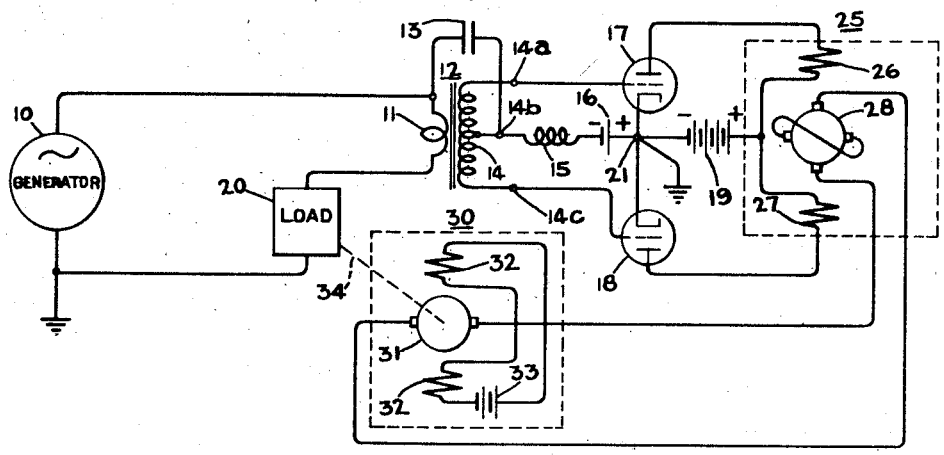

In the drawing, Fig. 1 is a simplified schematic illustration of a control circuit embodying my invention; Fig. 2 shows a pair of vector diagrams representing voltage and current relations for two different operating conditions of the circuit of Fig. 1; and Fig. 3 is a schematic illustration of another embodiment of my invention.

In accordance with the principles of operation of my invention, two voltages are generated, one of them proportional to the current flowing in the load circuit and in phase quadrature therewith, and the other proportional to, and in phase with, the voltage existing across the load. Means are then provided for splitting one of these voltages and providing vectorial addition of the two halves with the other voltage, detecting the resultant voltages in a manner to produce two unidirectional currents respectively proportional to their absolute magnitudes, and providing a control voltage responsive to the difference in magnitude of the two unidirectional currents.

Referring to Fig. 1, there is shown an alternating current generator 10 connected to a load 20. A phase-responsive circuit 12 comprises a current transformer having a primary winding 11 connected in series with the load, a center-tapped secondary winding 14, and a coupling capacitance 13 between the primary winding and the center tap. The two terminals 14a and 14c of the secondary winding are connected respectively to the control grids of a pair of triode valves 17 and 18 whose cathodes are grounded at point 21. Bias potential for the grids is provided by a battery 16 whose positive terminal is grounded and whose negative terminal is connected in series with an inductance 15 to the center tap 14b of the secondary winding. A source of operating potential for the valves is provided by a battery 19, through the differential windings 26 and 27 of an amplidyne generator 28. The output of the amplidyne generator is supplied to a direct current, shunt-wound motor 30, comprising an armature 31, and a pair of field windings 32 excited by a battery 33. A mechanical coupling between the armature 31 and a variable element in the load 20 is represented schematically by the dashed line 34. The load circuit may be a resistance with an inductance and a variable capacitance connected in parallel. The capacitance will then be the variable element mechanically coupled to the motor 30, and it will normally be adjusted to resonate with the inductance so that the circuit impedance is resistive at the operating frequency.

To illustrate the operation of the circuit of Fig. 1, let it be assumed that the load is tuned to resonance at the frequency of operation of the generator, so that the load current is in phase with the generated voltage. The voltage induced in the secondary of the current transformer is proportional to the current flowing in the load circuit and is in quadrature with respect to it.

The voltage generated is substantially equal to the voltage appearing across the load because the voltage drop caused by the reactance of the primary 11 of the transformer is very low. This voltage is supplied to the center tab 14b of the secondary winding by the capacitance 13. By choosing inductance 15 so that its reactance at the frequency of operation is much larger than that of the capacitance 13, substantially all the generator voltage is impressed between the center tap and ground. These conditions are illustrated by the vectors of Fig. 2A in which the symbols utilized have the following significance:

$E_G$ = generated voltage
$I_L$ = current through the load
$E_{s1}$ = voltage induced in the upper half of the secondary winding by the load current
$E_{s2}$ = voltage induced in the lower half of secondary winding by the load current
$E_{g1}$ = alternating voltage applied to the grid of valve 17
$E_{g2}$ = alternating voltage applied to the grid of valve 18

Figure 2A:
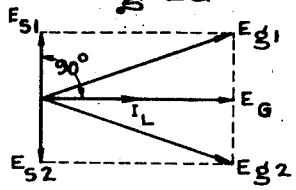
Figure 3:
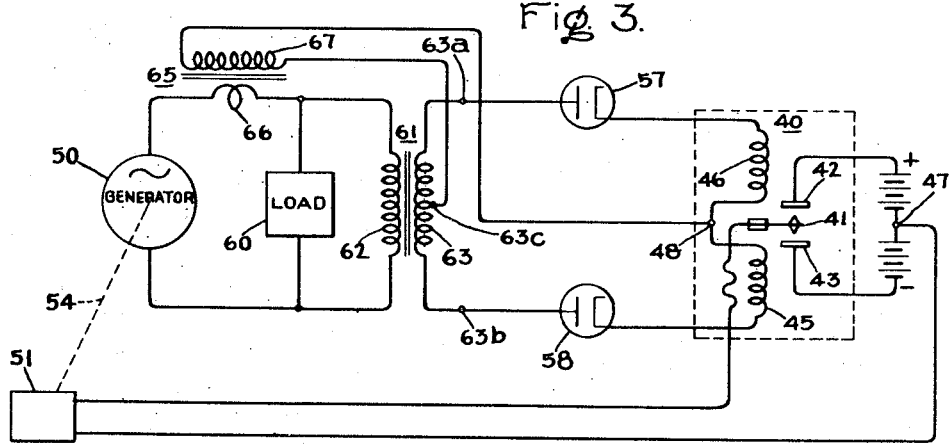

Referring to Fig. 2A, which illustrates the condition in which the load current is in phase with the generated voltage, the vector $I_L$ is in phase with the vector $E_G$. The voltages $E_{s1}$ and $E_{s2}$ induced in the two halves of the secondary winding are in opposite phase with respect to each other and are both at 90° with respect to the load current $I_L$. The voltages resulting from the vector additions of $E_G$ with $E_{s1}$ and $E_{s2}$, are $E_{G1}$ and $E_{G2}$ respectively and, for the condition when the load current is in phase with the generated voltage, are evidently equal in magnitude.

Figure 2B:
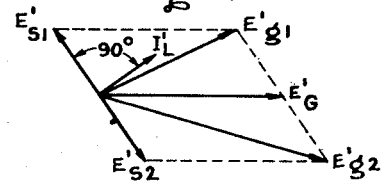

The condition when the load current leads the generated voltage is illustrated in Fig. 2B. The symbols utilized have the same significance as in Fig. 2A and are differentiated therefrom by the addition of a prime distinguishing mark. In this case the voltages induced in the two halves of the secondary winding are still in 90° phase relationship to the load current, but, since the load current $I'_L$ now leads the generated voltage, the phase angle between $E'_G$ and $E'_{s1}$ will be greater than the phase angle between $E'_G$ and $E'_{s2}$. As a result, the vector resultants $E'_{g1}$ and $E'_{g2}$ are now of different magnitudes.

By means of the battery 16, the operating bias on each of the control grids of valves 17 and 18 is adjusted so that, with no alternating voltage applied, the anode current is substantially cut off. When alternating voltage is applied to the grids, anode current flows in each valve during the positive half cycles. Accordingly, the average of the unidirectional current pulses flowing in each valve will result in a unidirectional component whose magnitude is proportional to the amplitude of the alternating voltage applied to the control grid.

The amplidyne generator 25 is of the split field winding type, in which the effective magnetization of the armature is proportional to the difference between the currents flowing in either half of the field winding 26, 27. Accordingly, an unbalance of currents in field windings 26 and 27 will result in the generation of an output voltage whose polarity depends upon the sense of the unbalance. As is well known in the art, a direct current, shunt-wound motor having a constant potential applied to its field windings, will have a speed and direction of rotation dependent upon the polarity and magnitude of the voltage applied to the armature. The motor 30 is of this type and, accordingly, the rate of correction applied to the controlled element in the load, will be in proportion to the voltage applied to the motor, and in turn proportional to the unbalance of the currents in the field winding of the amplidyne generator. This has the advantage of providing an acceleration to the correction which is proportional to the error existing, and also tends to prevent overshooting when a corrective action takes place so as to prevent oscillations about the correct value.

Referring to Fig. 3, there is shown another embodiment of my invention for utilization in a circuit comprising an alternating current generator 50 and a load 60. In this embodiment the load is not controlled and the variable element which is to be controlled is in the generator 50. The variable element may, for instance, be a variometer in the frequency determining circuit of an oscillator. The phase responsive circuit is similar to that of Fig. 1 but differs in the means for combining the voltages proportional to the load current and to the generated voltage. Instead of utilizing a current transformer with a center-tapped secondary to provide the two out-of-phase voltages, a voltage transformer 61 having a primary winding 62 and a secondary winding 63 is utilized for this purpose. Winding 63 has terminals 63a and 63b and a center tap 63c. The voltage proportional to the current flow in the load circuit is induced in the secondary of a current transformer 65, whose primary 66 is in circuit with the load and whose secondary 67 is connected between the center tap 63c and a point 48. The manner of the vectorial combination of these voltages will be apparent to one skilled in the art in view of the explanation which has been given of the operation of the circuit of Fig. 1. The ratio of the absolute magnitudes of the voltages resulting between the terminals 63a and 63b of the secondary winding of the voltage transformer and point 48 will be dependent upon the phase angle between current and voltage in the load circuit. Any suitable type of detection device responsive to the difference in these magnitudes may be utilized to control the variable element in the generator 50. In this embodiment, I have shown a pair of diode valves 57 and 58, serially connected between the terminals of the secondary winding of the voltage transformer 61 and the terminals of a pair of windings 45 and 46 of a differential relay 40. The armature of the relay 40 carries a contact 41 which makes connection with either one of a pair of contacts 42 and 43, depending upon the sense of the difference in the currents flowing through the windings 45 and 46. Contact 42 is connected to the positive terminal of a battery 47, and contact 43 to the negative terminal of the same battery. The contact member 41 and the mid-potential point of the battery are connected to a motor 51 which is mechanically coupled by a member 54 to the controlled element of the generator 50.

Where it is permissible to draw a small fraction of the energy in the load circuit for control purposes, the embodiment of Fig. 3 may operate as efficiently as that of Fig. 1 and have advantages in simplicity and economy.

While specific embodiments have been shown and described, it will, of course, be understood that various other modifications may be made without departing from the invention. The appended claims are, therefore, intended to cover any such modifications within the true spirit and scope of the invention.

What I claim as new and desire to secure by Letters Patent of the United States is:

1. A phase sensitive control network for maintaining a predetermined phase relation between current and voltage in an alternating current circuit comprising: means for producing a first measuring voltage proportional to and in quadrature with said circuit current; means for producing a second measuring voltage proportional to and in phase with said circuit voltage; a pair of terminals between which one of said measuring voltages is applied; an intermediate point; means to maintain said point at a mid-potential with respect to voltages applied between said pair of terminals; a common point, the other of said measuring voltages being applied between said points; detecting means connected between said terminals and said common point for producing unidirectional currents proportional to the amplitude of the voltages developed between said terminals and said common point; and means responsive to the difference in magnitude of said unidirectional currents for varying said phase relation.

2. A phase sensitive control network for maintaining a predetermined phase relation between current and voltage in an alternating current circuit comprising: a transformer having a primary winding through which said circuit current is made to flow and a secondary having two terminals and a center tap; a common point; means to apply said circuit voltage between said common point and said center tap; detecting means connected between said terminals and said common point for producing unidirectional currents proportional to the amplitude of the voltages developed between said terminals and said common point; and means responsive to the difference in magnitude of said unidirectional currents for varying said phase relation.

3. A phase sensitive control network for maintaining a predetermined phase relation between current and voltage in an alternating current circuit comprising: a transformer having a primary winding through which said circuit current is made to flow and a secondary having two terminals and a center tap; a common point; means to apply said circuit voltage between said common point and said center tap; a pair of electronic valves each having a cathode, a control electrode and an anode, said cathodes being connected to said common point and said control electrodes being connected to said terminals; means for applying a bias potential to said control electrodes to render said valves normally non-conducting; a source of anode operating potential, a winding serially connected between each said anode and said source; and means responsive to the difference in the magnetic forces resulting from unidirectional currents in said windings for varying said phase relation.

4. In combination with an alternating current circuit comprising a generator of alternating voltage and a utilization network connected thereto and drawing a current in a certain phase relationship with respect to said voltage, said network having a variable element for altering said phase relationship; a transformer having a primary winding connected in series with said network and a secondary winding having a pair of terminals and a center tap; a common point; a direct connection from one side of said network to said common point and a capacitive connection from the other side of said network to said center tap; a pair of electronic valves each having a cathode, a control electrode and an anode, said cathodes being connected to said common point and said control electrodes being connected to said terminals; a supply of bias potential and an inductance serially connected between said common point and said center tap, said bias potential being adjusted to normally render said valves non-conducting and said inductance being selected to present a high impedance in comparison with said network at the frequency of operation of said generator; a source of anode operating potential; a pair of windings serially connected between each said anode and said source; and means responsive to the difference in the magnetic forces resulting from unidirectional currents in said windings for controlling said variable element in a manner to maintain said phase relationship constant.

5. A system for automatically tuning a load circuit having a tuning element to the operating frequency of a generator whose frequency is variable over a band, comprising: a transformer having a primary winding connected in series with said load circuit and a secondary winding having a pair of terminals and a center tap; a common point; a direct connection from one side of said load circuit to said common point and a capacitive connection from the other side of said load circuit to said center tap; a pair of electronic valves each having a cathode, a control electrode and an anode, said cathodes being connected to said common point and said control electrodes being connected to said terminals; a supply of bias potential and an inductance serially connected between said common point and said center tap, said bias potential being adjusted to normally render said valves non-conducting and said inductance being selected to present a high impedance in comparison with the input impedance of said load circuit over the frequency range of said transmitter; a source of anode operating potential; an amplidyne generator having a pair of differential exciting windings serially connected between said anodes and said source; and a polarity-sensitive motor electrically connected to said amplidyne generator and mechanically coupled to said tuning element.

6. A system for automatically tuning a load circuit having a tuning element to the operating frequency of a generator whose frequency is variable over a band, comprising: a transformer having a primary winding connected in series with said load circuit and a secondary winding having a pair of terminals and a center tap; a common point; a direct connection from one side of said load circuit to said common point and a capacitive connection from the other side of said load circuit to said center tap; a pair of electronic valves each having a cathode, a control electrode and an anode, said cathodes being connected to said common point and said control electrodes being connected to said terminals; a supply of bias potential and an inductance serially connected between said common point and said center tap, said bias potential being adjusted to normally render said valves non-conducting and said inductance being selected to present a high impedance in comparison with the input impedance of said load circuit over the frequency range of said transmitter; a relay having a pair of differential windings serially connected between said anodes and said source; a polarity-sensitive motor mechanically coupled to said tuning element, and means controlled by said relay to apply a positive or a negative potential to said motor in accordance with the difference in the unidirectional currents flowing through said differential windings.

7. A system for automatically tuning a load circuit having a tuning element to the operating frequency of a generator whose frequency is variable over a band, comprising: a first transformer having a primary winding connected in parallel with said load circuit and a secondary winding having a pair of terminals and a center tap; a common point; a second transformer having a primary winding connected in series with said load circuit and a secondary winding connected to said center tap and said common point, said first and second transformers having primary windings offering impedances substantially higher and lower, respectively, than the input impedance of said load circuit; a pair of rectifiers having a pair of equivalent sides connected to said terminals; a relay having a pair of differential windings serially connected between the other sides of said rectifiers and said common point; a polarity-sensitive motor mechanically coupled to said tuning element; and means controlled by said relay to apply a positive or negative potential to said motor in accordance with the difference in the unidirectional currents flowing through said differential windings.

8. In an arrangement wherein a load circuit is energized from a source of electrical waves, means for automatically maintaining a predetermined phase relationship between the load circuit voltage and current resulting from said energization comprising first means for deriving a voltage in phase with an applied electrical signal, second means for deriving a voltage in quadrature phase with an applied signal, means for applying said current and voltage to respective ones of said deriving means as a signal, means for combining said derived voltages to obtain sum and difference voltages thereof, means for separately rectifying said sum and difference voltages, and means responsive to said rectified voltages to maintain said phase relationship.

JAMES K. CHAPMAN.

REFERENCES CITED

The following references are of record in the file of this patent:

UNITED STATES PATENTS

| Number | Name | Date |
| --- | --- | --- |
| 1,586,533 | Peterson | June 1, 1926 |
| 1,869,209 | Mead | July 26, 1932 |
| 2,412,442 | Crever | Dec. 10, 1946 |
| 2,455,646 | Beard | Dec. 7, 1948 |